US012799288B2

(12) United States Patent
Cao et al.

(10) Patent No.: US 12,799,288 B2
(45) Date of Patent: Nov. 17, 2026

(54) POLYURETHANE RESIN FILM

(71) Applicant: Huntsman International LLC, The Woodlands, TX (US)

(72) Inventors: Lan Cao, Derry, NH (US); Jason K. Smith, Orange, CA (US)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 11 days.

(21) Appl. No.: 18/285,501

(22) PCT Filed: Apr. 12, 2022

(86) PCT No.: PCT/US2022/024335
§ 371 (c)(1),
(2) Date: Oct. 4, 2023

(87) PCT Pub. No.: WO2022/221228
PCT Pub. Date: Oct. 20, 2022

(65) Prior Publication Data

US 2024/0368359 A1 Nov. 7, 2024

Related U.S. Application Data

(60) Provisional application No. 63/174,817, filed on Apr. 14, 2021.

(51) Int. Cl.

| | |
|---|---|
| ***C08J 5/18*** | (2006.01) |
| ***C08G 18/32*** | (2006.01) |
| ***C08G 18/44*** | (2006.01) |
| ***C08G 18/66*** | (2006.01) |
| ***C08G 18/75*** | (2006.01) |

(52) U.S. Cl.
CPC ............ *C08J 5/18* (2013.01); *C08G 18/3206* (2013.01); *C08G 18/44* (2013.01); *C08G 18/664* (2013.01); *C08G 18/758* (2013.01); *C08J 2375/04* (2013.01)

(58) Field of Classification Search
None
See application file for complete search history.

(56) References Cited

U.S. PATENT DOCUMENTS

| | | | |
|---|---|---|---|
| 4,024,113 | A | 5/1977 | Ammons |
| 2009/0104449 | A1 | 4/2009 | Farah et al. |

(Continued)

FOREIGN PATENT DOCUMENTS

| | | | |
|---|---|---|---|
| WO | 2014152819 | A1 | 9/2014 |
| WO | 2020225651 | A1 | 11/2020 |
| WO | 2022040373 | A1 | 2/2022 |

OTHER PUBLICATIONS

European Search Report of EP Application No. 22788743.7 filed Nov. 10, 2023.

(Continued)

*Primary Examiner* — Laura C Powers

(57) ABSTRACT

An aliphatic thermoplastic polyurethane resin composition comprising: (a) an isocyanate compound; (b) an isocyanate reactive compound; (c) a chain extender compound; and (d) one or more additives; and wherein after the thermoplastic polyurethane resin composition is formed into an aliphatic thermoplastic polyurethane film having a thickness of 0.1 mm, the aliphatic thermoplastic polyurethane film has: (x) a modulus of at least 800 MPa at 25° C. and (y) a haze value of less than 2%.

20 Claims, 1 Drawing Sheet

(56) References Cited

U.S. PATENT DOCUMENTS

| | | | |
|---|---|---|---|
| 2009/0280709 | A1 | 11/2009 | Rukavina et al. |
| 2010/0222524 | A1 | 9/2010 | Lawrey et al. |

OTHER PUBLICATIONS

International Search Report and Written Opinion of PCT Application No. PCT/EP2022/024335 filed Apr. 12, 2023.
Chinese office action issued Apr. 2, 2026 in corresponding chinese application No. 202280028299.4 filed Oct. 13, 2023 (machine translation included).
"Plastics Application Technology handbook", Zhou Changming, p. 611, China Machinery Industry Press, May 31, 2013, 1st Edition.
Chinese Rejection Decision issued Sep. 11, 2026 in corresponding CN application No. 202280028299.4 filed Oct. 13, 2023 (machine translation included).

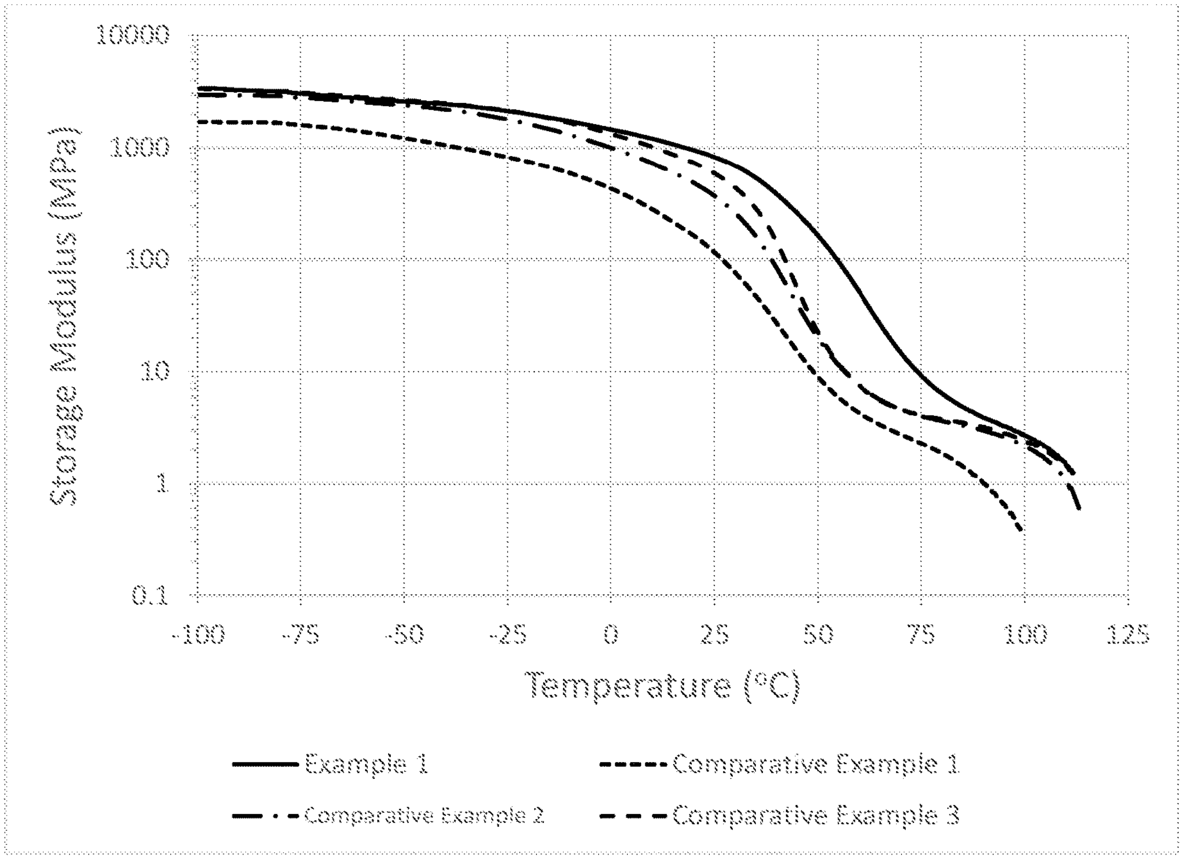
10000
1000
100
10
1
0.1
Storage Modulus (MPa)
-100
-75
-50
-25
0
25
50
75
100
125
Temperature (°C)
Example 1
Comparative Example 1
Comparative Example 2
Comparative Example 3

POLYURETHANE RESIN FILM

CROSS-REFERENCE TO RELATED APPLICATIONS

This application is a national phase of International Application No. PCT/US2022/024335 filed Apr. 12, 2022, which designates the U.S. and claims priority to U.S. Provisional Application No. 63/174,817 filed Apr. 14, 2021. The noted applications are incorporated herein by reference.

BACKGROUND

Field

The present disclosure relates generally to a polyurethane composition. Specifically, the present disclosure is directed to an aliphatic thermoplastic polyurethane film material.

Background

Aliphatic thermoplastic polyurethane film is often used in applications that require certain tear strength, abrasion resistance, optical clarity, and flex performance. These applications can range from protecting an automotive vehicle's paint to being a layer used in an aircraft transparency to a being a layer used in ballistic glazing.

While aliphatic thermoplastic polyurethane films are useful in a myriad of applications, one short coming of some thermoplastic polyurethane films is their inability to withstanding processing/handling conditions (e.g., sputtering coating, hot air drying) during the manufacture of certain products due to their lack of mechanical durability. In other words, these thermoplastic polyurethane films exhibit softness and low modulus making them unsuitable in the manufacture of these products. Due to their inherent shortcomings, manufacturers have attempted to use aromatic thermoplastic polyurethane films in place of aliphatic thermoplastic polyurethane films. However, unlike aliphatic thermoplastic polyurethane films, these aromatic films have poor UV resistance as well as high color.

BRIEF DESCRIPTION OF THE DRAWINGS

An understanding of this disclosure can be gained from the following description of certain embodiments when read in conjunction with the accompanying drawings in which:

FIG. 1 is a graph depicting the modulus of certain thermoplastic polyurethane products manufactured pursuant to the Examples.

DETAILED DESCRIPTION

Aliphatic Polyurethane Resin Composition

The present disclosure is directed to an aliphatic thermoplastic polyurethane resin that can withstand the processing/handling conditions that are often encountered during the manufacture of certain products. Accordingly, the present disclosure is directed to an aliphatic thermoplastic polyurethane resin composition comprising: (a) an isocyanate compound; (b) an isocyanate reactive compound; (c) a chain extender compound; and (d) one or more additives; and wherein after the thermoplastic polyurethane resin composition is formed into an aliphatic thermoplastic polyurethane film having a thickness of 0.1 mm, the aliphatic thermoplastic polyurethane film has: (x) a modulus of at least 800 MPa at 25° C. and (y) a haze value of less than 2%.

Component (a): Isocyanate Compound

Suitable polyisocyanate compounds that may be used as a reactive ingredient to form the thermoplastic polyurethane material include aliphatic, araliphatic, and/or aromatic polyisocyanates. The isocyanate compounds typically have the structure $R—(NCO)_x$ where x is at least 2 and R comprises an aromatic, aliphatic, or combined aromatic/aliphatic group.

Suitable aliphatic isocyanate compounds that may be used as Component (a) include hexamethylene diisocyanate ("HDI"), isophorone diisocyanate ("IPDI"), butylene diisocyanate, trimethylhexamethylene diisocyanate, di(isocyanatocyclohexyl) methane ("H12MDI"), isocyanatomethyl-1,8-octane diisocyanate, 1,4-cyclohexanediisocyanate ("CDI"), or combinations thereof.

Suitable aromatic isocyanate compounds that may be used as Component (a) include diphenylmethane diisocyanate ("MDI"), toluene diisocyanate ("TDI") (e.g., 2,4 TDI, 2,6 TDI, or combinations thereof), tetramethylxylene diisocyanate ("TMXDI"), 1,5-naphtalenediisocyanate ("NDI"), p-phenylenediisocyanate ("PPDI"), tolidine diisocyanate ("TODI"), or combinations thereof. Accordingly, suitable isocyante compounds that may be used include RUBINATER 44 isocyanate available from Huntsman International LLC.

In some embodiments, the isocyanate compound is liquid at room temperature. A mixture of isocyanate compounds may be produced in accordance with any technique known in the art.

Component (a) can comprise 10 weight % to 70 weight % (e.g., 30% to 60% or 40% to 60%) based on the total weight of Components (a)-(d).

Component (b): Isocyanate Reactive Compound

Any of the known organic compounds containing at least two isocyanate reactive moieties per molecule may be employed as isocyanate reactive compound used as a reactive ingredient to form the polyurethane coating layer. Polyol compounds or mixtures thereof having a molecular weight ranging from 60 to 10,000 (e.g., 300 to 10,000 or less than 5,000), a nominal hydroxyl functionality of at least 2, and a hydroxyl equivalent weight of 30 to 2000 (e.g., 30 to 1,500 or 30 to 800) can be used as Component (b).

Examples of suitable polyols that may be used as Component (b) include polyether polyols such as those made by addition of alkylene oxides to initiators, which containing from 2 to 8 active hydrogen atoms per molecule. In some embodiments, the aforementioned initiators include glycols, glycerol, trimethylolpropane, triethanolamine, pentaerythritol, sorbitol, sucrose, ethylenediamine, ethanolamine, diethanolamine, aniline, toluenediamines (e.g., 2,4 and 2,6 toluenediamines), polymethylene polyphenylene polyamines, N-alkylphenylene-diamines, o-chloro-aniline, p-aminoaniline, diaminonaphthalene, or combinations thereof. Suitable alkylene oxides that may be used to form the polyether polyols include ethylene oxide, propylene oxide, and butylene oxide, or combinations thereof. Other suitable polyol compounds that may be used as Component (b) include Mannich polyols having a nominal hydroxyl functionality of at least 2 and having at least one secondary or tertiary amine nitrogen atom per molecule.

In certain embodiments, the polyols that are used are polyether polyols that comprise propylene oxide ("PO"), ethylene oxide ("EO"), or a combination of PO and EO groups or moieties in the polymeric structure of the polyols. These PO and EO units may be arranged randomly or in block sections throughout the polymeric structure. In certain embodiments, the EO content of the polyol ranges from 0 to 100% by weight based on the total weight of the polyol (e.g., 50% to 100% by weight). In some embodiments, the PO content of the polyol ranges from 100 to 0% by weight based on the total weight of the polyol (e.g., 100% to 50% by weight). Accordingly, in some embodiments, the EO content of a polyol can range from 99% to 33% by weight of the polyol while the PO content ranges from 1% to 66% by weight of the polyol. Moreover, in some embodiments, the EO and/or PO units can either be located terminally on the polymeric structure of the polyol or within the interior sections of the polymeric backbone structure of the polyol. Suitable polyether polyols include poly(oxyethylene oxypropylene) diols and triols obtained by the sequential addition of propylene and ethylene oxides to di- or trifunctional initiators that are known in the art. In certain embodiments, Component (b) comprises the aforementioned diols or triols or, alternatively, Component (b) can comprise a mixture of these diols and triols.

The aforementioned polyether polyols also include the reaction products obtained by the polymerization of ethylene oxide with another cyclic oxide (e.g., propylene oxide) in the presence of polyfunctional initiators such as water and low molecular weight polyols. Suitable low molecular weight polyols include ethylene glycol, propylene glycol, diethylene glycol, dipropylene glycol, cyclohexane dimethanol, resorcinol, bisphenol A, glycerol, trimethylolopropane, 1,2,6-hexantriol, pentaerythritol, or combinations thereof.

Polyester polyols that can be used as Component (b) include polyesters having a linear polymeric structure and a number average molecular weight (Mn) ranging from about 500 to about 10,000 (e.g., preferably from about 700 to about 5,000 or 700 to about 4,000) and an acid number generally less than 1.3 (e.g., less than 0.8). The molecular weight is determined by assay of the terminal functional groups and is related to the number average molecular weight. The polyester polymers can be produced using techniques known in the art such as: (1) an esterification reaction of one or more glycols with one or more dicarboxylic acids or anhydrides; or (2) a transesterification reaction (i.e. the reaction of one or more glycols with esters of dicarboxylic acids). Mole ratios generally in excess of more than one mole of glycol to acid are preferred so as to obtain linear polymeric chains having terminal hydroxyl groups. Suitable polyester polyols also include various lactones that are typically made from caprolactone and a bifunctional initiator such as diethylene glycol. The dicarboxylic acids of the desired polyester can be aliphatic, cycloaliphatic, aromatic, or combinations thereof. Suitable dicarboxylic acids which can be used alone or in mixtures generally have a total of from 4 to 15 carbon atoms include succinic, glutaric, adipic, pimelic, suberic, azelaic, sebacic, dodecanedioic, isophthalic, terephthalic, cyclohexane dicarboxylic, or combinations thereof. Anhydrides of the aforementioned dicarboxylic acids (e.g., phthalic anhydride, tetrahydrophthalic anhydride, or combinations thereof) can also be used. The glycols used to form suitable polyester polyols can include aliphatic and aromatic glycols having a total of from 2 to 12 carbon atoms. Examples of such glycols include ethylene glycol, 1,2-propanediol, 1,3-propanediol, 1,3-butanediol, 1,4-butanediol, 1,5-pentanediol, 1,6-hexanediol, 2,2-dimethyl-1,3-propanediol, 1,4-cyclohexanedimethanol, decamethylene glycol, dodecamethylene glycol, or combinations thereof.

Polycarbonate diols that can be used as Component (b) include those compounds that are prepared by reacting a formaldehyde with a polyol such as a glycol compound (e.g., diethylene glycol, triethylene glycol, or hexanediol (1,6-Hexanediol), 1,10-decanediol, 1,4-butanediol, or combinations thereof). Other polycarbonate diols that may be used include the reaction product of dimethyl carbonate or diphenyl carbonate with a polyol.

Additional examples of suitable polyols include hydroxyl-terminated polythioethers, polyamides, polyesteramides, polyacetals, polyolefins, polysiloxanes, and simple glycols such as ethylene glycol, butanediols, diethylene glycol, triethylene glycol, the propylene glycols, dipropylene glycol, tripropylene glycol, and mixtures thereof.

The active hydrogen-containing material may contain other isocyanate reactive material such as, without limitation, polyamines and polythiols. Suitable polyamines include primary and secondary amine-terminated polyethers, aromatic diamines such as diethyltoluene diamine and the like, aromatic polyamines, and combinations thereof.

Component (b) can comprise 30 weight % to 90 weight % (e.g., 30% to 70% or 30% to 50%) based on the total weight of Components (a)-(d).

Component (c): Chain Extender Compound

Suitable compounds that may be used as the chain extender compound include low molecular weight diols and bifunctional low molecular weight glycol ethers. Examples of suitable law molecular weight diols include ethylene glycol, 1,2-propanediol, 1,3-propanediol, 1,2-butanediol, 1,3-butanediol, 1,4-butanediol, 1,5-pentanediol, 1,6-hexanediol, diethylene glycol, dipropylene glycol, neopentyl glycol, 3-methyl-1,5-pentanediol, 2,2-diethyl-1,3-propanediol, 2-n-butyl-2-ethyl-1,3-propanediol, 2,2,4-trimethyl-1,3-pentanediol, 2-ethyl-1,3-hexanediol, 1,4-cyclohexane dimethanol, 1,4-bis(2-hydroxyethoxy)benzene, or combinations thereof.

Component (c) can comprise 1 weight % to 20 weight % (e.g., 5% to 15% or 10% to 15%) based on the total weight of Components (a)-(d).

Component (d): Additives

Suitable compounds that may be used as the one or more additives include a hindered amine light stabilizer compound, an antioxidant compound, or combinations thereof.

Suitable hindered amine light stabilizer compound that may be used in the thermoplastic polyurethane resin composition include additives from the TINUVIN family of hindered amine light stabilizers available from BASF (including additives equivalent in structure available from other manufacturers).

Suitable antioxidant compounds that may be used in the thermoplastic polyurethane resin composition include additives from the IRGANOX, IRGAFOS family of antioxidant compounds available from BASF (including additives equivalent in structure available from other manufacturers), or combinations thereof.

Component (d) can be equal or less than 2 weight % (e.g., 0.5% to 1.5% or 0.2% to 1%) based on the total weight of Components (a)-(d).

Method of Making an Aliphatic Thermoplastic Polyurethane Product

The aliphatic thermoplastic polyurethane film disclosed herein is formed from an aliphatic thermoplastic polyurethane composition comprising: (a) an isocyanate compound; (b) an isocyanate reactive compound; (c) a chain extender compound; and (d) one or more additives.

In certain embodiments, the components listed above can all be introduced into a reaction vessel simultaneously. In these embodiments, an aliphatic thermoplastic polyurethane resin will form in situ in the presence of the other additives present in the reaction vessel. It is noted that these other additives, such as the ultraviolet absorbers mentioned above, will not be incorporated into the polymer structure of the thermoplastic polyurethane resin. Rather, these additives will simply be found in the matrix of the thermoplastic polyurethane resin composition.

In other embodiments, the reactive components (i.e., Components (a)-(c)) used to form the aliphatic thermoplastic polyurethane resin can first be added to the reaction vessel prior to introduction of the other additives described above. In some embodiments, the aliphatic polyurethane resin can be partially formed prior to introduction of the additives.

After the reaction is complete, the aliphatic thermoplastic polyurethane material that is formed can then be subject to various processing steps. For example, the material can be granulated and pelletized to form aliphatic thermoplastic polyurethane resin beads. These beads can then be processed further, such as through an extrusion process, to form an aliphatic thermoplastic polyurethane film.

Properties of Aliphatic Thermoplastic Polyurethane Composition Film

When the aliphatic polyurethane composition of the present disclosure is used to form an aliphatic thermoplastic polyurethane film having a thickness of 0.1 mm, the film has: (x) a modulus of at least 800 MPa at 25° C.; (y) a haze value of less than 2%; and (z) a Shore D Hardness of at least 60. In some embodiments, the modulus is at least 50 MPa at 60° C.

The modulus of the aliphatic thermoplastic polyurethane film can be tested using the MOD-TEST. The MOD-TEST consists of the following steps: (1) inserting a thermoplastic polyurethane film (e.g., the aliphatic thermoplastic polyurethane film disclosed herein) having a thickness of 0.1 mm into a Q800 dynamic mechanical analyzer available from TA Instruments, Inc.; and (2) using the Q800 dynamic mechanical analyzer to measure the modus of the thermoplastic polyurethane film by setting the analyzer to tension mode.

The haze of the aliphatic thermoplastic polyurethane film can be tested using the HAZE-TEST. The HAZE-TEST consists of the following steps: (1) inserting a thermoplastic polyurethane film (e.g., the aliphatic thermoplastic polyurethane film disclosed herein) having a thickness of 0.1 mm into a Haze-gard Plus haze meter available from Haze-gard Plus from BYK-Gardner GmbH; and (2) using the Haze-gard Plus haze meter to measure the haze of the thermoplastic polyurethane film as outlined by ASTM D1003.

The hardness of the aliphatic thermoplastic polyurethane film can be tested using the HARDNESS-TEST. The HARDNESS-TEST consists of the following steps: (1) molding a thermoplastic polyurethane composition (e.g., the aliphatic thermoplastic polyurethane composition disclosed herein) into a disc shape having a thickness of 3 mm; (2) inserting the molded disc into a Model 307L durometer hardness tester available from Pacific Transducer Corp.; and (3) using the Model 307L durometer hardness tester to measure the hardness of the molded disc as outlined by ASTM D2240.

Miscellaneous

While specific embodiments of the disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosure which is to be given the full breadth of the claims appended and any and all equivalents thereof. Therefore, any of the features and/or elements which are listed above may be combined with one another in any combination and still be within the breadth of this disclosure.

As used herein, unless otherwise expressly specified, all numbers such as those expressing values, ranges, amounts or percentages may be read as if prefaced by the word "about", even if the term does not expressly appear. Plural encompasses singular and vice versa.

As used herein, "plurality" means two or more while the term "number" means one or an integer greater than one.

As used herein, "includes" and like terms means "including without limitation."

When referring to any numerical range of values, such ranges are understood to include each and every number and/or fraction between the stated range minimum and maximum. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "molecular weight" means weight average molecular weight (Mw) as determined by Gel Permeation Chromatography.

Unless otherwise stated herein, reference to any compounds shall also include any isomers (e.g., stereoisomers) of such compounds.

EXAMPLES

Components:

Isocyanate: H12MDI available from Covestro AG.

Polyol 1: Eternacoll UH-200 polycarbonate diol available from UBE Industries, Ltd.

Polyol 2: A PTMEG diol available from Invista S.A.R.L.

Polyol 3: A polycaprolactone diol available from Ingevity Corp.

Polyol 4: A polybutanediol adipate available from Polyurethanes Specialties Co.

Chain Extender: 1,4-BDO available from LyondellBassell Industries N.V.

Additive Package: Mixture of an antioxidant available from BASF Corp. and a UV stabilizer available from BASF Corp.

Example 1

The aliphatic thermoplastic polyurethane material described in this disclosure was synthesized through a one-shot process by mixing the Isocyanate, Polyol, Chain Extender, and Additive Package in a reaction vessel. After the reaction mixture reached 100° C., it was poured into a Teflon lined mold and set at 23° C. for 2 days. The product was then granulated and pelletized. The pellets were extruded into film of 0.1 mm thick for physical property testing. Additional information relating to Example 1 can be found in Table 1 below.

Comparative Examples 1-3

Comparative thermoplastic polyurethane materials were synthesized through a one-shot process by mixing the Isocyanate, Polyol, Chain Extender, and Additive Package in a reaction vessel. After the reaction mixture reached 100° C., it was poured into a Teflon lined mold and set at 23° C. for 2 days. The product was then granulated and pelletized. The pellets were extruded into film of 0.1 mm thick for physical property testing. Additional information relating to Comparative Examples 1-3 can be found in Table 1 below. Comparative Examples 1-3 are representative of aliphatic thermoplastic polyurethane materials that are currently used in the urethane film industry.

TABLE 1

| Sample | Example 1 | Comparative Example 1 | Comparative Example 2 | Comparative Example 3 |
|---|---|---|---|---|
| | Composition, wt % | | | |
| Polyol 1 | 38.57 | | | |
| Polyol 2 | | 43.77 | | |
| Polyol 3 | | | 38.47 | |
| Polyol 4 | | | | 38.36 |
| Isocyanate | 46.01 | 44.62 | 46.08 | 47.19 |
| Chain Extender | 13.89 | 9.84 | 13.92 | 12.81 |
| Additives Package | 1.53 | 1.77 | 1.53 | 1.64 |
| | Film Properties | | | |
| E' @ 25° C. (MPa) | 824 | 116 | 369 | 116 |
| E' @ 60° C. (MPa) | 51.5 | 4.3 | 7.6 | 5.0 |
| Haze (%) | 1.3 | 0.7 | 1.2 | 1.7 |
| Hardness (shore D) | 60 | 53 | 60 | 60 |

The modulus of the film was determined using a Q800 dynamic mechanical analyzer from TA Instruments in tension mode. Haze of the film was measured according to ASTM D1003 using a Haze-gard Plus machine available from BYK. Hardness was measured according to ASTM D2240.

Results

In Example 1, the combined amount of diisocyanate and chain extender, commonly known as hard block content in polyurethane chemistry, accounts for 60 wt % of the total formulation. The hard block content of Comparative Examples 2 and 3 were the same as Example 1 while Comparative Example 1 had a slightly lower hard block content. The storage modulus (E') of Example 1, from DMA measurement, is several times or more higher than that of Comparative Examples 1, 2, and 3 at 25° C. and 60° C. At the same time, Example 1 maintains good transparency with haze less than 2%. It is evident that the use of a Polyol 1 and high hard block content in the formulation results in a very rigid material that is more mechanically durable. Further support of the results can be found in FIG. 1.

What is claimed is:

1. An aliphatic thermoplastic polyurethane resin composition comprising: a reaction product of Components comprising (a) an isocyanate compound; (b) an isocyanate reactive compound; (c) a chain extender compound; and (d) one or more additives; wherein the Components are devoid of a polyol having a hydroxyl number of 3 or greater; and wherein after the thermoplastic polyurethane resin composition is formed into an aliphatic thermoplastic polyurethane film having a thickness of 0.1 mm, wherein the aliphatic thermoplastic polyurethane film has: (x) a modulus of at least 800 MPa at 25° C. and (y) a haze value of less than 2%.

2. The aliphatic thermoplastic polyurethane resin composition according to claim 1, wherein Component (a) is present in amount ranging from 40 to 60 weight % based on the total weight of Components (a)-(d).

3. The aliphatic thermoplastic polyurethane resin composition according to claim 1, wherein Component (b) is present in amount that is equal or less than 40 weight % based on the total weight of Components (a)-(d).

4. The aliphatic thermoplastic polyurethane resin composition according to claim 1, wherein Component (c) is present in amount that is equal or less than 15 weight % based on the total weight of Components (a)-(d).

5. The aliphatic thermoplastic polyurethane resin composition according to claim 1, wherein Component (d) is present in amount that is equal or less than 2 weight % based on the total weight of Components (a)-(d).

6. The aliphatic thermoplastic polyurethane resin composition according to claim 1, wherein Component (d) comprises an antioxidant compound, a UV-stabilizer compound, or combinations thereof.

7. The aliphatic thermoplastic polyurethane resin composition according to claim 1, wherein the Components are fully reacted and the thermoplastic polyurethane resin composition is in a pelletized or granulated form.

8. The aliphatic thermoplastic polyurethane resin composition according to claim 1, wherein the modulus is measured using the MOD-TEST and the haze is measured using the HAZE-TEST.

9. The aliphatic thermoplastic polyurethane resin composition according to claim 1, wherein the thermoplastic polyurethane resin has a hard block content ranging from 50 to 70 weight % based on the total weight of Components (a)-(d).

10. A method of making an aliphatic thermoplastic polyurethane film comprising:

providing an aliphatic thermoplastic polyurethane resin composition comprising: a reaction product of Components comprising (a) an isocyanate compound; (b) an isocyanate reactive compound; (c) a chain extender compound; and (d) one or more additives; wherein the Components are devoid of a polyol having a hydroxyl number of 3 or greater;

forming an aliphatic thermoplastic polyurethane film having a thickness of 0.1 mm from the aliphatic thermoplastic polyurethane resin composition, wherein the aliphatic thermoplastic polyurethane film has: (x) a modulus of at least 800 MPa at 25° C. and (y) a haze value of less than 2%.

11. The method according to claim 10, wherein Component (a) is present in amount ranging from 40 to 60 weight % based on the total weight of Components (a)-(d).

12. The method according to claim 10, wherein Component (b) is present in amount that is equal or less than 40 weight % based on the total weight of Components (a)-(d).

13. The method according to claim 10, wherein Component (c) is present in amount that is equal or less than 15 weight % based on the total weight of Components (a)-(d).

14. The method according to claim 10, wherein Component (d) is present in amount that is equal or less than 2 weight % based on the total weight of Components (a)-(d).

15. The method according to claim 10, wherein Component (d) comprises an antioxidant compound, a UV-stabilizer compound, or combinations thereof.

16. The method according to claim 10, wherein the method further comprises fully reacting the Components to form the aliphatic thermoplastic polyurethane resin composition and pelletizing or granulating the aliphatic thermoplastic polyurethane resin composition.

17. The method according to claim 16, forming the polyurethane material into the polyurethane film.

18. The method according to claim 17, wherein the step of forming is an extrusion process.

19. The method according to claim 10, wherein the modulus is measured using the MOD-TEST and the haze is measured using the HAZE-TEST.

20. The method according to claim 10, wherein the thermoplastic polyurethane resin has a hard block content ranging from 50 to 70 weight % based on the total weight of Components (a)-(d).

* * * * *